United States Patent
Wang et al.

(10) Patent No.: US 10,579,065 B2
(45) Date of Patent: Mar. 3, 2020

(54) ALGORITHM AND INFRASTRUCTURE FOR ROBUST AND EFFICIENT VEHICLE LOCALIZATION

(71) Applicant: Baidu USA LLC, Sunnyvale, CA (US)

(72) Inventors: Quan Wang, Sunnyvale, CA (US); Jing Zhai, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 229 days.

(21) Appl. No.: 15/360,882

(22) Filed: Nov. 23, 2016

(65) Prior Publication Data

US 2018/0143647 A1    May 24, 2018

(51) Int. Cl.
| | |
|---|---|
| *G01C 21/30* | (2006.01) |
| *G05D 1/02* | (2020.01) |
| *G06N 20/00* | (2019.01) |
| *G01S 17/02* | (2020.01) |
| *G01S 17/06* | (2006.01) |
| *G01S 7/48* | (2006.01) |

(Continued)

(52) U.S. Cl.
CPC .......... *G05D 1/0274* (2013.01); *G01C 21/30* (2013.01); *G01S 7/4808* (2013.01); *G01S 13/86* (2013.01); *G01S 17/023* (2013.01); *G01S 17/06* (2013.01); *G05D 1/0088* (2013.01); *G06N 20/00* (2019.01); *G01C 21/32* (2013.01)

(58) Field of Classification Search
CPC .. G06K 9/00288; G06N 7/005; G06N 99/005; G06N 20/00; G05D 1/00; G05D 1/02; G05D 1/0261; G05D 2201/0213; G05D 1/0274; G05D 1/0088; G05D 1/0278; G05D 1/0257; G05D 1/0255; G05D 1/0248; G05D 1/0242; G05D 1/024; G05D 1/0236; G05D 1/0214; G06F 17/30244; G01S 13/86; G01S 7/4808; G01S 17/06; G01S 17/023; G01C 21/005; G01C 21/26; G01C 21/28; G01C 21/30; G01C 21/32
USPC ......... 701/301, 533, 27, 448, 469, 523, 514; 700/264; 702/150; 706/52; 382/118; 348/207.1
See application file for complete search history.

(56) References Cited

U.S. PATENT DOCUMENTS

| | | | | |
|---|---|---|---|---|
| 4,962,458 A | * | 10/1990 | Verstraete | G01C 21/3446 701/533 |
| 5,047,916 A | * | 9/1991 | Kondo | B25J 9/1666 700/264 |

(Continued)

*Primary Examiner* — Nadeem Odeh
(74) *Attorney, Agent, or Firm* — Womble Bond Dickinson (US) LLP

(57) ABSTRACT

Location of an autonomous driving vehicle (ADV) is determined with respect to a high definition map. On-boards sensors of the ADV obtain a 3D point cloud of objects surrounding the ADV. The 3D point cloud is organized into an ADV feature space of cells. Each cell has a median intensity value and a variance in elevation. To determine the ADV location, a coarse search of a subset of cells in the ADV feature space performed with respect to the high definition map, using a similarity metric that is based on the median intensity and variance in elevation of the candidate cell. When similarity of the first candidate cell is determined, a lookup table of similarity scores is generated and used for determining the similarity score for subsequent candidate cells. Then a fine search is performed on a small subset of candidate cells surrounding the highest similarity score cell.

24 Claims, 13 Drawing Sheets

(51) Int. Cl.
*G01S 13/86* (2006.01)
*G05D 1/00* (2006.01)
*G01C 21/32* (2006.01)

(56) References Cited

U.S. PATENT DOCUMENTS

| | | | | |
|---|---|---|---|---|
| 8,885,151 | B1* | 11/2014 | Chatham | G01S 17/42 |
| | | | | 356/4.07 |
| 9,283,958 | B2* | 3/2016 | Ulbricht | G08G 1/167 |
| 2003/0046021 | A1* | 3/2003 | Lasky | G05D 1/0261 |
| | | | | 702/150 |
| 2014/0079297 | A1* | 3/2014 | Tadayon | G06K 9/00 |
| | | | | 382/118 |
| 2014/0201126 | A1* | 7/2014 | Zadeh | G06K 9/627 |
| | | | | 706/52 |
| 2014/0297092 | A1* | 10/2014 | Delp | G05D 1/0212 |
| | | | | 701/25 |
| 2015/0022675 | A1* | 1/2015 | Lord | G06K 9/6253 |
| | | | | 348/207.1 |
| 2015/0046078 | A1* | 2/2015 | Biess | G08G 1/166 |
| | | | | 701/301 |
| 2016/0097644 | A1* | 4/2016 | Strassenburg-Kleciak | |
| | | | | G01C 21/30 |
| | | | | 701/461 |
| 2017/0076162 | A1* | 3/2017 | Nordbruch | G06K 9/00805 |
| 2017/0109644 | A1* | 4/2017 | Nariyambut Murali | |
| | | | | G06N 20/00 |
| 2018/0056800 | A1* | 3/2018 | Meichle | B60L 11/1833 |

\* cited by examiner

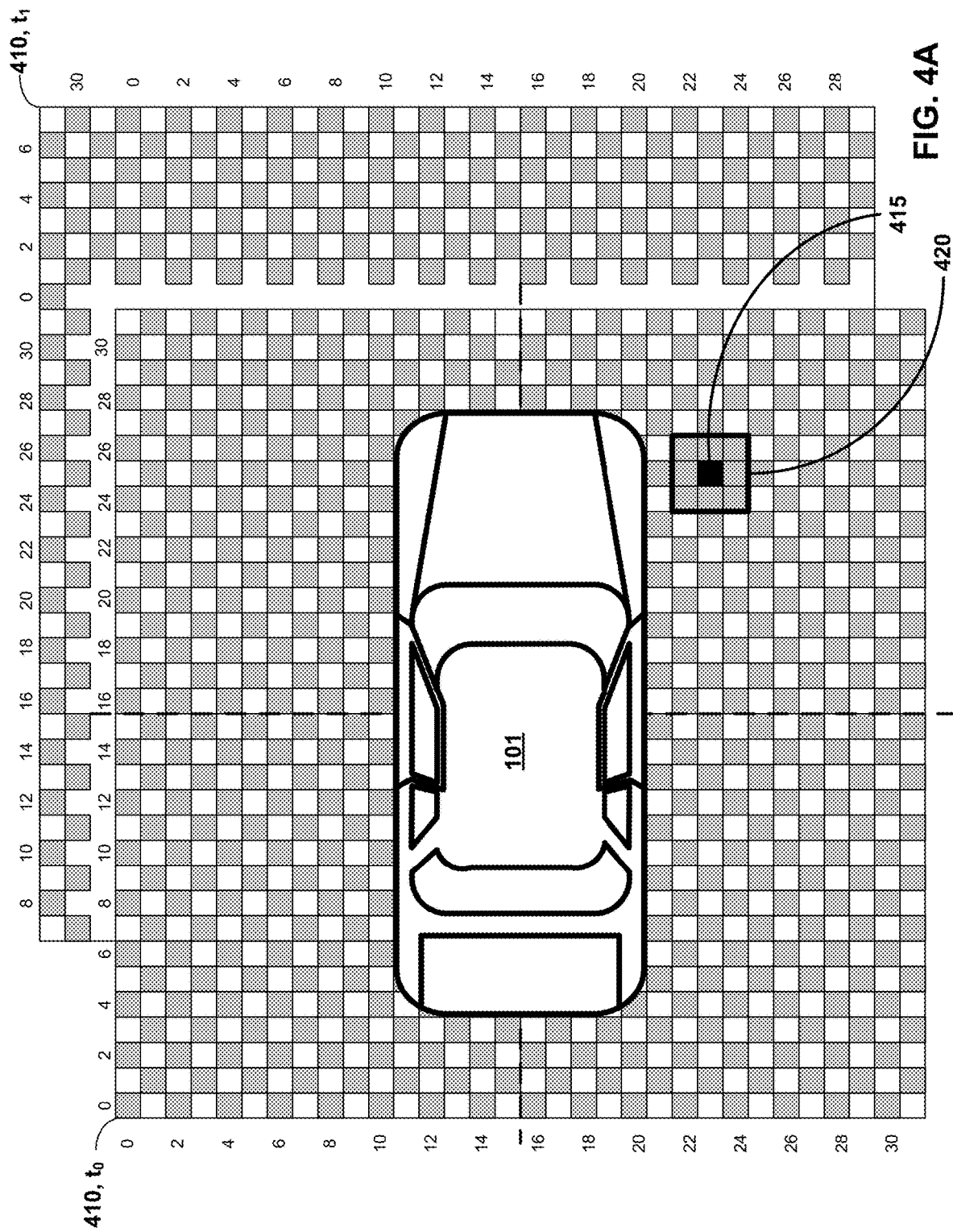

ALGORITHM AND INFRASTRUCTURE FOR ROBUST AND EFFICIENT VEHICLE LOCALIZATION

TECHNICAL FIELD

Embodiments of the present invention relate generally to operating autonomous vehicles. More particularly, embodiments of the invention relate to improving efficiency and accuracy of autonomous vehicle localization.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

One fundamental challenge of autonomous driving is efficiently, accurately, and in real-time, determining the location of an autonomous driving vehicle (ADV) with respect to a high definition (HD) map having various crucial information annotated. In a worst case, accuracy needs to be within 10 cm. ADV position in the high definition (HD) map is used by ADV system components such as perception, planning, and control, to make precise and timely ADV driving decisions. To determine a position of the ADV within the HD map, one or more ADV position sensors are included in, or on, the ADV. Sensors can include a global positioning satellite detector (GPS), inertial measurement unit sensor (IMU), radio detection and ranging (RADAR) and light detection and ranging (LIDAR). Existing hardware-based positioning systems, such as global positioning satellite sensor (GPS) and inertial measurement unit sensor (IMU) cannot provide the necessary accuracy with respect to the HD map, especially for dynamic urban environment having complex signal occlusion situations.

Existing localization methods for autonomous driving vehicles typically are of three major categories: 2D, 3D and 2D-3D fused methods. Among these three, 3D based methods using laser scanner (e.g. LIDAR sensor) is currently popular due to its high accuracy and reliability. Prior art methods using a LIDAR sensor to determine ADV position in an HD map are computationally expensive and have only modest accuracy and modest robustness.

BRIEF DESCRIPTION OF THE DRAWINGS

Embodiments of the invention are illustrated by way of example and not limitation in the figures of the accompanying drawings in which like references indicate similar elements.

FIG. 4A illustrates an ADV surrounded by an ADV coarse search space and ADV fine search space of candidate cells to use for searching an HD map to determine the location of the ADV with respect to the HD map, according to some embodiments.

DETAILED DESCRIPTION

Figure 1:
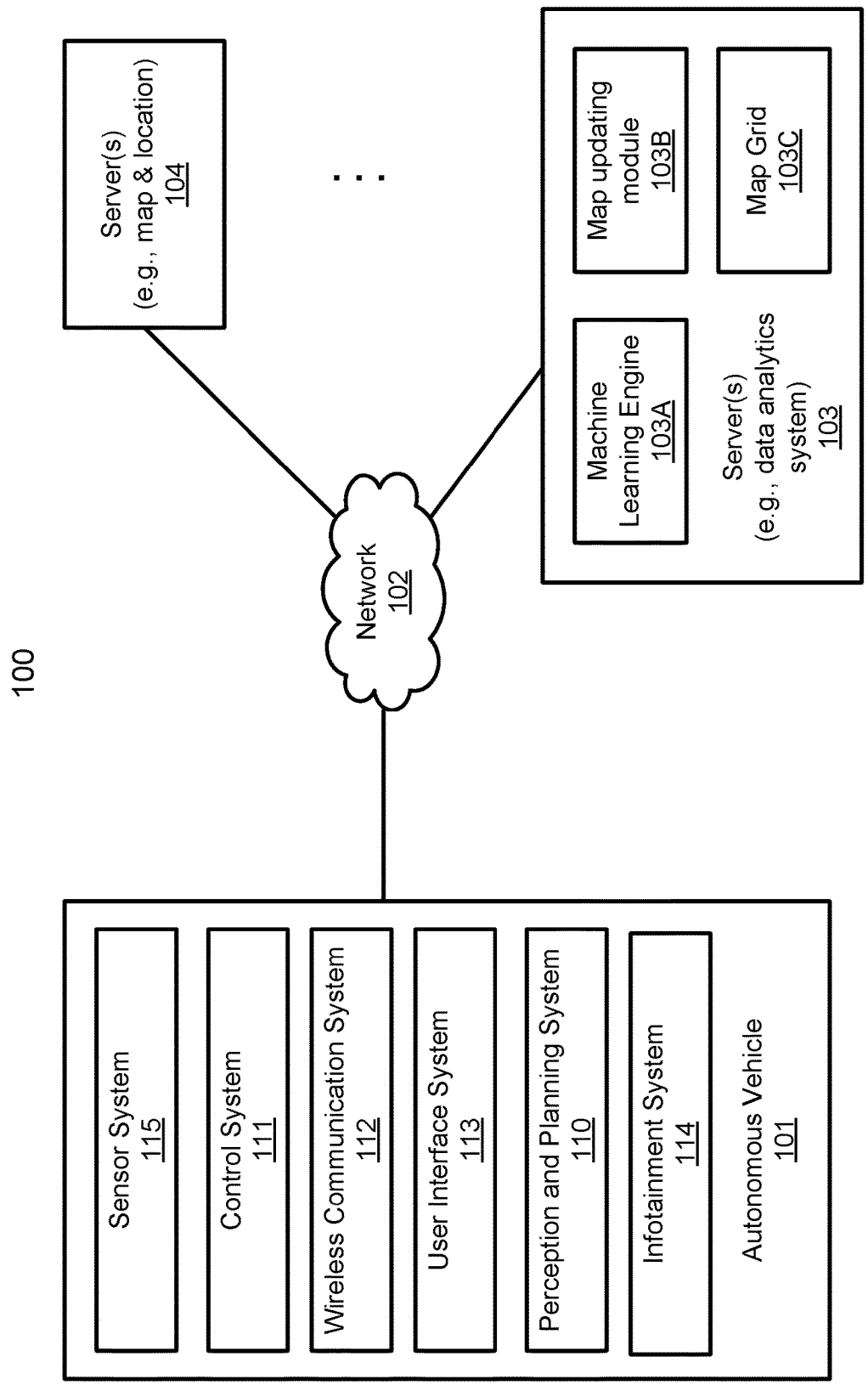
FIG. 1 is a block diagram illustrating an overview of a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In a first embodiment, a method of determining a location of an ADV with respect to a high definition (HD) map includes determining an approximate location of the ADV using, e.g., global position satellite location data. A database containing an HD map corresponding to the GPS location can be accessed to obtain an annotated feature space of the HD map. A typical GPS reading is accurate within about 3 meters resolution. The HD map can include cells, e.g. 10 cm×10 cm, with an elevation associated with each cell and an intensity value, such as an intensity value obtained from a plurality of LIDAR readings. An intensity value indicates a nature of the surface of an object that reflects the LIDAR. An intensity may be high for an object having a hard surface directly reflecting the LIDAR laser. An intensity may be low for an object having soft or irregular surface, such as a bush or a person. The HD map can include annotations for each cell including a mean of sensor intensity readings used to generate the cell, and a variance of elevation information obtained from the plurality of sensor readings used to generate the cell. Each cell may further include location information that can be used to determine the location of an ADV with respect to the HD map.

An ADV can use sensors, e.g. LIDAR, to collect a 3D point cloud of sensor data surrounding the ADV. The sensor data can be analyzed and broken down into cells, such as 10 cm×10 cm, or less. Like the HD map, the collection of cells can be used to generate a feature space surrounding the ADV. A feature space can comprise (x,y) coordinates of a cell, with respect to the ADV, a mean intensity of the sensor readings, and a variance of the elevation readings in the sensor data. From the ADV feature space, a coarse search space of, e.g. 32×32 candidate cells can be selected that surround the ADV, representing a physical space of about 3 meters×3 meters. A step size can be chosen to step through the candidate cells. For example, a step size of two would mean that every other cell in the candidate cells is used to determine a similarity of a feature space surrounding the candidate cell for its similarity to an HD map feature space. The candidate feature space surrounding the candidate cell can be about 1024×1024 cells (a square of about 100 meters per side). The HD map can also have an HD map feature space of about 1024×1024 cells. A similarity metric can be determined for each traversed candidate cell. The similarity metric quantifies the degree of similarity of a feature space surrounding the candidate cell to a feature space of the HD map. The similarity metric can be based, at least in part, on a mean of the intensity attribute of the candidate cell, and the variance of the elevation attribute of the cell. In an embodiment, the first candidate cell similarity metric can be computed. A lookup table can be generated using data produced by the first candidate computed similarity metric. The lookup table can be used to lookup an approximation of the similarity metric for the second, and subsequent, candidate cells. A candidate cell having a highest similarity metric can be determined. A fine search candidate space can be determined from the candidate cell having the highest similarity metric. In an embodiment, the fine search candidate space can be 3 cells×3 cells. In an embodiment, the similarity metric for each of the fine search candidate cells of the ADV can be computed. In an embodiment, one or more of the fine search candidate cell similarity metrics can be determined using the lookup table.

In another embodiment, an ADV can collect 3D point cloud information for use in generating an update to the HD map. An approximate location of the ADV can be determined using, e.g., global position satellite location data. A portion of the HD map corresponding to the approximate location of the ADV can be obtained. In an embodiment, the HD map portion is at least 1024×1024 cells in size (a square of approximately 100 meters on each edge). The ADV can use sensors, e.g. LIDAR, to collect the 3D point cloud of sensor data surrounding the ADV. The 3D point cloud can be analyzed and broken down into cells, such as 10 cm×10 cm, or less. The collection of cells can be used to generate a feature space surrounding the ADV. A feature space can comprise (x,y) coordinates of a cell, with respect to the ADV, a mean intensity of the sensor readings, and a variance of the elevation readings in the sensor data. From the ADV feature space, a coarse search space of, e.g. 32×32 candidate cells can be selected that surround the ADV, representing a physical space of about 3 meters×3 meters. A step size can be chosen to step through the candidate cells. For example, a step size of two would mean that every other cell in the candidate cells is used to check a candidate feature space surrounding the candidate for its similarity to an HD map feature space. The candidate feature space surrounding the candidate cell can be about 1024×1024 cells (a square of approximately 100 meters on each edge). The HD map can also have an HD map feature space of about 1024×1024 cells. A similarity metric can be determined for each of the candidate cells. The similarity metric can be based, at least in part, on a mean of the intensity attribute of the candidate cell, and the variance of the elevation attribute of the cell. In an embodiment, the first candidate cell similarity metric is calculated and a lookup table can be generated to lookup an approximation of the similarity metric for the second, and subsequent, candidate cells. A candidate cell having a highest similarity metric can be determined. A fine search candidate space can be determined from the candidate cell having the highest similarity metric. In an embodiment, the fine search candidate space can be 3×3 cells. In an embodiment, the similarity metric for each of the fine search candidate cells of the ADV can be computed. In an embodiment, one or more of the fine search candidate cell similarity metrics can be determined using the lookup table.

After the ADV feature space is aligned to the HD map, the ADV feature space can be uploaded to a server for further analysis to update the HD map. In an embodiment, the server analyzes differences between the uploaded ADV feature space, and the HD map feature space. Differences may include new buildings, trees, people, different temporary objects, and the like. In an embodiment, the elevation information of a cell is a reliable indicator of the cell contents. For example, one or more a tall buildings are likely to be a relatively constant in the HD map, and may be more constant than e.g. people who have motion (thus varying intensity) and a low height as compared to buildings.

In another embodiment, an improved data structured for storing large, fast-changing data sets, such as the ADV features space surrounding the ADV, can include a pre-allocated, or static, array of feature space cells indexed by an updateable index. In an embodiment, an array of feature space cells can determine a number of cells of distance change (offset) since a last feature space calculation. An x-coordinate index array and a y-coordinate index array can be used to rotate or realign the indices of the grid of feature space cells so that new data can be added, overwriting old data that is no longer a part of the grid of the feature space. This allows data that is unchanged from a first time, t0, to a second time t1, to remain in the same grid space memory at a second time t1. This saves a substantial amount of memory "move" operations and also saves the overhead of allocating and deallocating memory space as the ADV physically moves and the ADV feature space data is updated.

FIG. 1 is a block diagram illustrating an autonomous driving vehicle network configuration 100 according to one embodiment of the invention. Referring to FIG. 1, network configuration 100 includes autonomous vehicle 101 that may be communicatively coupled to one or more servers 103-104 over a network 102. Although there is one autonomous vehicle 101 shown, multiple autonomous vehicles can be coupled to each other and/or coupled to servers 103-104 over network 102. Network 102 may be any type of network such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc. An example server system is described below with reference to FIG. 11. Server(s) 103 can include an analytics system that include a machine learning engine 103A and a map updating module 103B, and a map grid module 103C.

An autonomous vehicle 101 refers to a vehicle that can be configured in an autonomous mode in which the vehicle navigates through an environment with little or no control input from a driver. Such an autonomous vehicle 101 can include a sensor system 115 having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Server 103 can include a data analytics system that includes a machine learning engine 103A, a map updating module 103B, and a map grid module 103C. Each such module can be implemented in software, hardware, or a combination thereof. In an embodiment, modules 103A, 103B, and 103C comprise at least one hardware processor.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
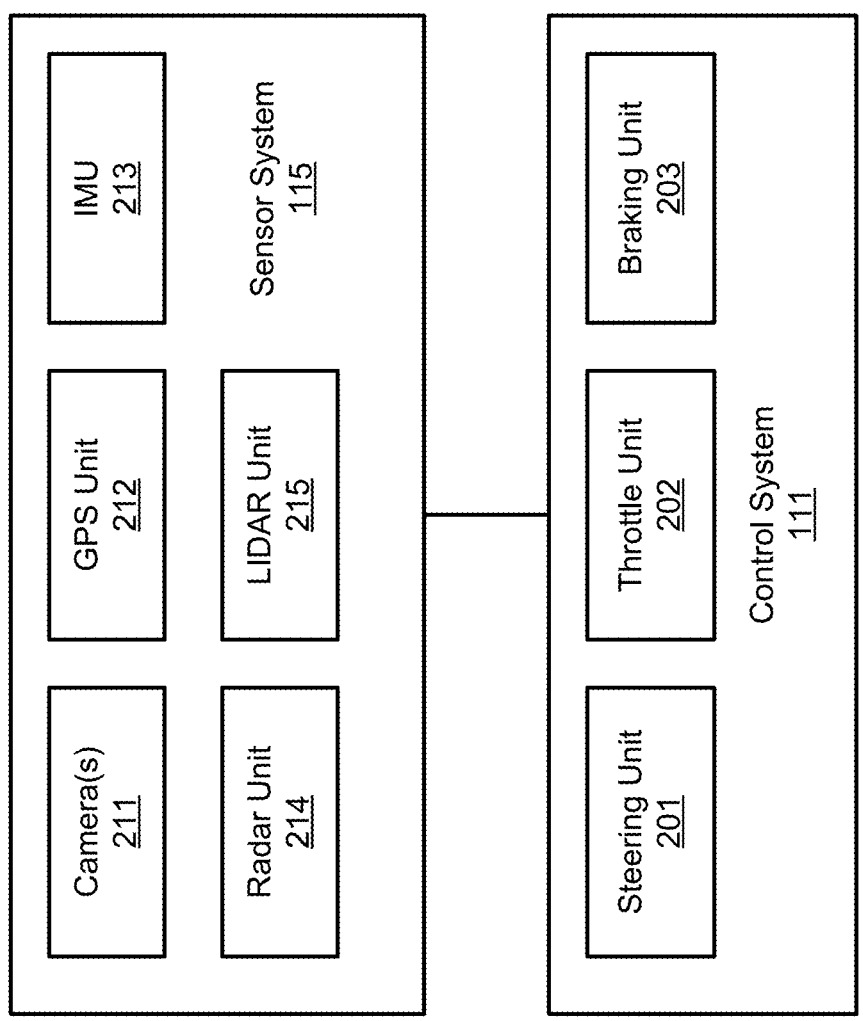
FIG. 2 is a block diagram illustrating an example of an autonomous driving vehicle (ADV) sensor and control module, according to one embodiment of the invention.

FIG. 2 is a block diagram illustrating an example of an autonomous vehicle 101 (AV) sensor and control module, according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as a sonar sensor, an infrared sensor, a steering sensor, a throttle sensor, a braking sensor, and an audio sensor (e.g., microphone). An audio sensor may be configured to capture sound from the environment surrounding the autonomous vehicle 101. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111. In an embodiment, a planning portion of the perception and planning module 110 can be turned off. In an embodiment, control system 111 can be turned off. The autonomous vehicle 101 can then be driven by a human driver while the planning and control modules are turned off. The embodiments described herein utilize the planning module 110 and control systems 111, which are turned on.

In operation, a user as a passenger may specify a starting location and a destination of a trip, for example, via a user interface 113. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

In an autonomous vehicle 101, there may be no actual or physical window. Rather, a "window" (referred to herein as a virtual window) may be represented or replaced by a display device, i.e., a flat or curved screen display device molded into a shape of a vehicle window, optionally with a touch screen. The display device would display images or stream of images (e.g., video) that are captured dynamically in real-time by an appropriate camera or cameras, as if the user were watching or viewing the actual physical content through a see-through window. For each of the "windows" (e.g., display devices), there can be a corresponding display channel to stream the corresponding content to be displayed at real-time, which may be centrally processed by an augmenting reality system, e.g., a data processing system 110. In such situation, an augmented image is displayed in a virtual reality manner via infotainment system 114, also referred to as an augmented reality manner.

In embodiments described herein, outputs from each sensor in the sensor system 115 can be logged while the autonomous vehicle 101 driven in automated mode, with the planning and control modules turned on. Inputs to components of the control system 111 can be provided by the planning module 110.

Figure 3:
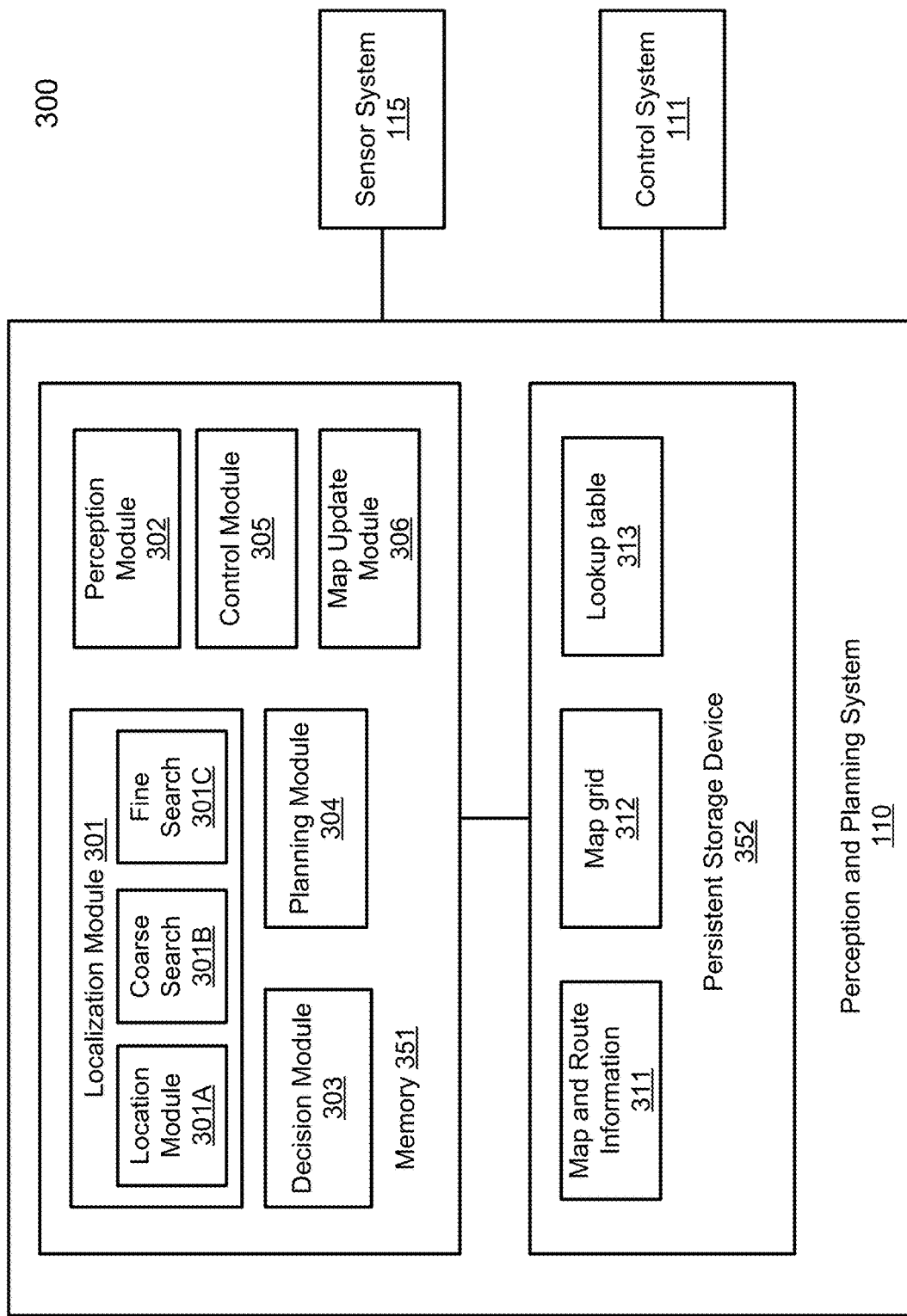
FIG. 3 is a block diagram illustrating an example of an ADV perception and planning system, according to one embodiment of the invention.

FIG. 3 is a block diagram 300 illustrating an example of a perception and planning system 110 used with an autonomous vehicle 101 according to one embodiment of the invention. System 300 may be implemented as a part of autonomous vehicle 101 of FIG. 1 including, but not limited to, perception and planning system 110, control system 111, and sensor system 115. Referring to FIG. 3, perception and planning system 110 includes, but is not limited to, localization module 301, perception module 302, decision module 303, planning module 304, control module 305, and a map update module 306.

Some or all of modules 301-306 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-306 may be integrated together as an integrated module.

Localization module 301 (also referred to as a map and route module) manages any data related to a trip or route of a user. A user may log in and specify a starting location and a destination of a trip, for example, via a user interface. Localization module 301 communicates with other components of autonomous vehicle 101, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

An object of the localization module 301 is to determine with high accuracy a location of the ADV. ADV location can be approximately determined using, e.g. GPS. The GPS coordinate can be used to obtain a high definition (HD) map with a center at the GPS location and having an HD map feature space of cells of approximately 100 meters×100 meters. The ADV onboard sensors of the perception module 302 can also generate an ADV feature space of cells of approximately 100 meters×100 meters surrounding the ADV. To determine the actual location of the ADV with respect to the HD map, localization module 301 can find a best match of a candidate cell in a candidate portion of the ADV feature space to the HD map. The match determines an offset of the ADV from the GPS-centered HD map feature space. This offset can be used, in conjunction with the HD map feature space, to determine the actual high accuracy location of the ADV.

Localization module 301 can include a location module 301A, a coarse search module 301B, and a fine search module 301C. A location module 301A can obtain a 3D point cloud of sensor data from the sensors in perception module 302. The 3D point cloud represents sensor data surrounding the ADV. Location module 301A can analyze the 3D point cloud and generate an ADV feature space of cells of data, each representing an area of approximately 10 cm×10 cm. Each cell can have an (x,y) coordinate in the ADV feature space, a mean intensity and a variance of the elevation. In an embodiment, the ADV feature space contains approximately 1024×1024 cells surrounding the ADV. The location module 301A can also obtain an approximate location of the ADV from, e.g. a GPS reading or coordinating with cell towers. The location module 301A can also obtain a high definition (HD) map of cells representing an HD map feature space of approximately 1024×1024 cells surrounding the GPS coordinate. Each cell of the HD map feature space can have an (x,y) coordinate representing an actual location of the cell in a real coordinate space, such as high resolution GPS or other coordinate system. Each cell of the HD map feature space can further include a mean intensity for the cell, and a variance of the elevation in the cell. The HD map feature space can further include annotations, including actual high-resolution location of each cell of the HD map, street address information, business information, restaurants, gas stations, and other useful information.

The approximate accuracy of GPS is about 3 meters resolution. Coarse search module 301B can determine a candidate space of, e.g., 32×32 cells, surrounding the ADV, and match an ADV feature space of, e.g., 1024×1024 cells surrounding each candidate cell of the candidate space with an HD map feature space of, e.g., 1024×1024 cells. Matching is performing using a similarity metric that performs a hybrid Gaussian fit of the candidate cell feature space (e.g. 1024×1024 cells) to the HD map feature space (e.g. 1024×1024 cells). The similarity metric is as follows:

$$P(z|x,y,m) = \prod_{ij} \exp\left(\frac{-(m_{r_{(i-x,j-y)}} - z_{r_{(i,j)}})^2}{2*(m_{\sigma_{(i-x,j-y)}} + z_{\sigma_{(i,j)}})^2}\right)^\alpha;$$

wherein P(z|x, y, m) represents a similarity score for the candidate feature space surrounding a candidate cell to the HD map feature space, i and j are iterators each ranging from 1 ... 1024, (x, y) are the coordinates of a candidate cell, m represents map feature space cell data, z represents ADV feature space cell data, r represents the mean of a value, σ represents the variance of a value, and a is a tuning parameter. In an embodiment, the mean intensity of ADV and HD map feature space cell data are used in the numerator of the exp function and the variance of elevation of ADV and HD map feature space data is used in the denominator of the exp function. The similarity metric used to determine a similarity score for each candidate cell in the candidate space of, e.g., 32×32 cells. In an embodiment, a coarse search of the candidate space is performed by determining the similarity metric for, e.g. every other cell, or every third cell, or other increment. A highest similarity score from among the candidate cells is determined. In an embodiment, a fine search is performed by fine search module 301C around the candidate cell with the highest similarity score of the coarse search, above. A fine search space is a second set of candidate cells, e.g. 3×3 cells. The fine search can be performed using the similarity metric for each of the second set of candidate cells. The candidate cell having the highest similarity score from the second set of candidate cells is used as the best matching cell to the center of the HD map feature space. An offset from the ADV coordinate in the ADV feature space to the best matching cell can be used to determine the high resolution location of the ADV with respect to the HD map feature space.

As can be seen above, the similarity score can be computationally intensive, but must be computed in real time. In an embodiment, after, or during, the computation of the similarity score of a first candidate cell, a range of intensity values and a range of elevation values can be determined. For example, the range of intensity values can be determined as the lowest and highest difference values between the HD map mean intensity and ADV feature space cell mean intensity. The range of elevation values can be determined as the lowest and highest sum of values of the HD map feature space elevation variance and ADV feature space cell elevation variance. Once a range is determined for the mean intensity and elevation variance, a step-wise increment can be determined for each. For example, if the range of the mean intensity difference is 0.1 through 14.9, then a range for intensity of 0, 1, 2, ..., 15 can be used as an estimated range for the difference of the mean intensity for an HD map feature space cell and an ADV feature space cell. Similarly, if the range for elevation variance is, e.g., in the range of 0.0 through 0.81, then a range for elevation of 0.0, 0.1, 0.2, ..., 0.8 can be used as an estimated range for the sum of elevation variance between the HD map feature space cell elevation variance and the ADV feature space cell. Using the determined estimated ranges, above, a table of estimated similarity values can be generated by computing the similarity metric for each combination of the range of mean intensities and range of elevation variances. This substantially reduces the amount of computation to determine a good estimate of the similarity score for a candidate cell.

In an embodiment, the coarse search described above can use the lookup table of similarity scores. The fine search described above can compute the similarity score for each candidate cell in the fine search. In an embodiment, the lookup table can be used for the fine search similarity scores.

Perception and planning system 110 can also include a perception module 302. Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 can make a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules, which may be stored in persistent storage device 352 (not shown).

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 101 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and steering commands) at different points in time along the path or route.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Map update module 306 can be used to gather ADV feature space data and obtain an HD map feature space at an approximate location of the ADV, align the ADV feature space to the HD map feature space using techniques as described above for localization module 301, and upload the ADV feature space, with reference to the corresponding HD map feature space, to a server, such as server 103 for analysis. The server side functionality is described above with reference to FIG. 1, map updating module 103B and Map Grid 103C.

Persistent storage device 352 can include map and route information 311, map grid 312, and lookup table 313. Map and route information can be used to determine a sequence of navigation operations to arrive at a destination. Navigation operations can be expressed as arcs in a graph with weights and attributes that characterize the route, such as speed, traffic, signals, road type, etc. Map grid 312 can be a complete map grid of all known HD map grid feature space within a certain driving locality, such as "within the U.S." or "within California" or "within San Francisco." In an embodiment, map grid 312 can be downloaded as needed from a server, e.g. server 103 or 104, for a radius around the ADV, such as a 100 mile radius. Lookup table 313, described above, can be written to memory 351 (not shown) or persistent storage 352.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

FIG. 4A illustrates and ADV surrounded by an ADV coarse search space 410 and ADV fine search space of candidate cells 420 to use for searching an HD map to determine the location of the ADV with respect to the HD map, according to some embodiments.

An ADV 101 can have a localization module 301 that receives 3D point cloud data from perception module 302. Location module 301A can generate an ADV feature space of e.g. 1024×1024 cells from the 3D point cloud data. Each cell can be, e.g. 10 cm×10 cm and can include (x,y) position coordinates with respect to the ADV, a mean intensity value, an elevation variance value, and other sensor data. As described above, with reference to FIG. 3, it is an object of the Localization Module 301 to determine an accurate location of the ADV with respect to the real world and an HD map representing the real world around the ADV. The ADV can use, e.g. a GPS reading to obtain the HD map section representing the real world around the ADV. The HD map can be, e.g., 1024 cells×1024 cells, each cell representing, e.g. 10 cm×10 cm. Coarse search module 301B can select a coarse search candidate space 410 from the ADV feature space. The coarse search candidate space 410 is subset of the ADV feature space that surrounds the ADV. The coarse search candidate space 410 can be, e.g. 32×32 cells. In an embodiment, the coarse search candidate space 410 can be traversed in increments of e.g. two. For example, a similarity metric can be determined for coarse search candidate space 410 at time t0 at (x,y)=(0,0). A next similarity metric can be determined for the coarse search candidate space 410 at time t0 at (x,y)=(2,0), then at (4,0), and so on. After searching the coarse search candidate space 410 at time t0, the coarse search can locate a candidate cell 415 in the coarse search candidate space 410 having a highest similarity metric, indicating that the candidate cell feature space most closely matches the HD map feature space. Fine search module 301C can determine a fine search candidate space 420 surrounding the candidate cell 415 having the highest similarity metric. In an embodiment, the fine search candidate space 420 can be, e.g., 3 cells×3 cells surrounding the candidate cell 415 with the highest similarity score in the coarse search candidate space 410. Fine search module 301C can determine a similarity metric for each candidate cell in the fine search candidate space 420. Fine search module 301C can determine a highest similarity score from among the candidate cells in the fine search candidate space 420. The candidate cell with the high similarity score from the fine search candidate cells 420 can be then be determined as coinciding with the center of the HD map feature space. An offset from the ADV to the center of the HD map can be determined, and the offset can be used to determine the location of the ADV in the real world corresponding the HD map feature space, with high accuracy.

At time t1, the above process can be repeated. Assuming that the ADV is moving, the ADV feature space at time t1 may have some common data with the ADV feature space at time t0. FIG. 4A illustrates a 32×32 coarse search candidate space 410 at time t0 and at time t1. An analogous concept applies to the entire ADV feature space (1024×1024 cells) at time t0 and time t1. Rather than shifting data within the data structure that holds, e.g. the coarse search candidate space, as the ADV moves localization module 301 can determine how much the ADV has moved and how much of the data in the coarse search space 410 is the same at time t1 as at time t0, but is logically displaced by new candidate search space cells of data at time t1. Instead of shifting data in the data structure, an array of indices can be shifted for each of the x-coordinate and y-coordinate directions, as is appropriate for the movement of the ADV. As shown in FIG. 4A, candidate search space 410 at time t1 has added new data as the ADV moves to the right. In the example in the figure, the new coarse search candidate space data is stored in columns 0, 2, 4, and 6 of the coarse search candidate space, overwriting old data. In an embodiment, as the ADV moves forward from time t0 to time t1, new candidate search space cells would be logically be added at e.g. at columns 32, 33, et seq. In an example candidate search space of 32×32 cells, the x-coordinate index of the candidate search array space can be incremented, modulo 32, to obtain the candidate search space array index at which to add new ADV feature space data. Thus, logical column 32 would be 32 modulo 32=0, logical column 33 would be 33 modulo 32=1, et seq. The y-coordinate of a candidate search space grid can be similarly computed. The above example of adding data to a candidate search space of 32×32 can be extended to the ADV feature space, which can be approximately 1024×1024 cells. In an embodiment, the ADV feature space can be 1024×1024 cells to facilitate the ADV feature space data array modulus computation.

Figure 4B:
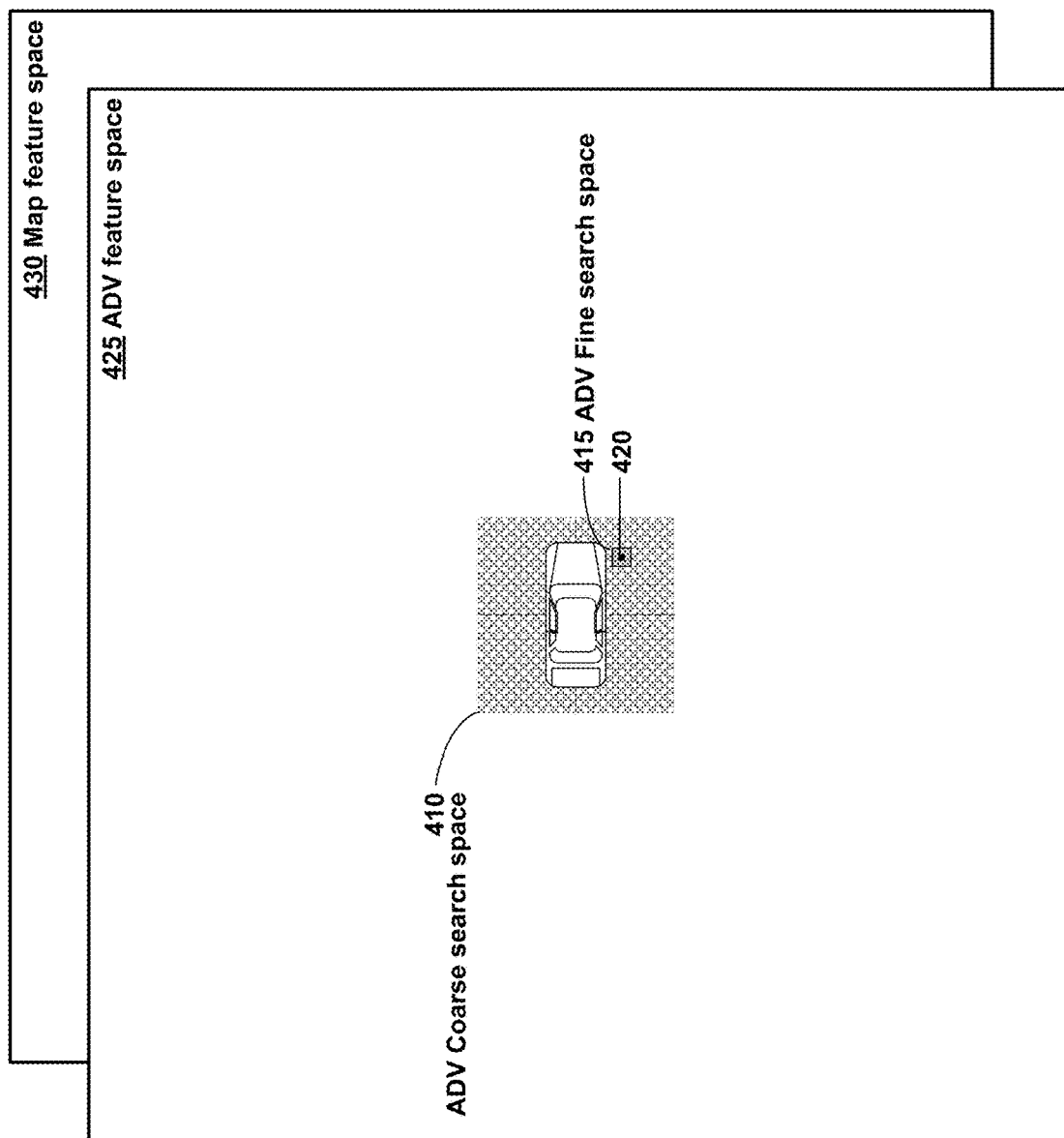
FIG. 4B illustrates an ADV surrounded by an array or grid of candidate cells to use for searching an HD map to determine the location of the ADV with respect to the HD map, and an ADV feature space surrounding the ADV coarse and fine candidate search space, according to some embodiments.

FIG. 4B illustrates and ADV 101 surrounded by an array or grid of candidate cells to use for searching an HD map to determine the location of the ADV with respect to the HD map, and an ADV feature space surrounding the ADV coarse and fine candidate search space, according to some embodiments.

As described above, an object of the localization module 301 is alignment of an ADV feature space, generated from a 3D point cloud of sensor data, to a high definition (HD) map feature space that is centered on a location, e.g. a GPS coordinate, obtained by the ADV. Aligning the ADV feature space to the HD map feature space is an operation in a process to determine the ADV location in the real world, and with respect to the HD map, with high accuracy.

FIG. 4B illustrates the coarse search space 410 of FIG. 4A set in the context of the ADV feature space 425 and HD map feature space 430. The HD map feature space 430 may be offset from the ADV feature space 425 due to limited accuracy of the location sensor, e.g. GPS coordinate or cell tower coordination, that was used to obtain the approximate location of the ADV. For each candidate cell traversed in the ADV coarse search space 410, a feature space of approximately 1024×1024 cells surrounding the candidate cell is compared to the HD map feature space 430 and a similarity score is determined for the candidate cell. A candidate cell having a highest similarity score 420 among the candidate cells in ADV coarse search space 410 is used to generate a fine search space 415 of approximately 3×3 cells. Each candidate cell in the ADV fine search space 415 is traversed and a similarity score is determined. The ADV fine search space 415 candidate cell with the highest similarity score from among the fine search candidate cells 415 is selected as being the cell which best aligns the ADV feature space 425 to the HD map feature space 430. An offset is determined from the ADV to the candidate cell in the ADV fine search space 415 having the highest similarity score to the HD map feature space. The offset is used to determine, with high accuracy, the location of the ADV with respect to the HD map and real world.

Figure 5A:
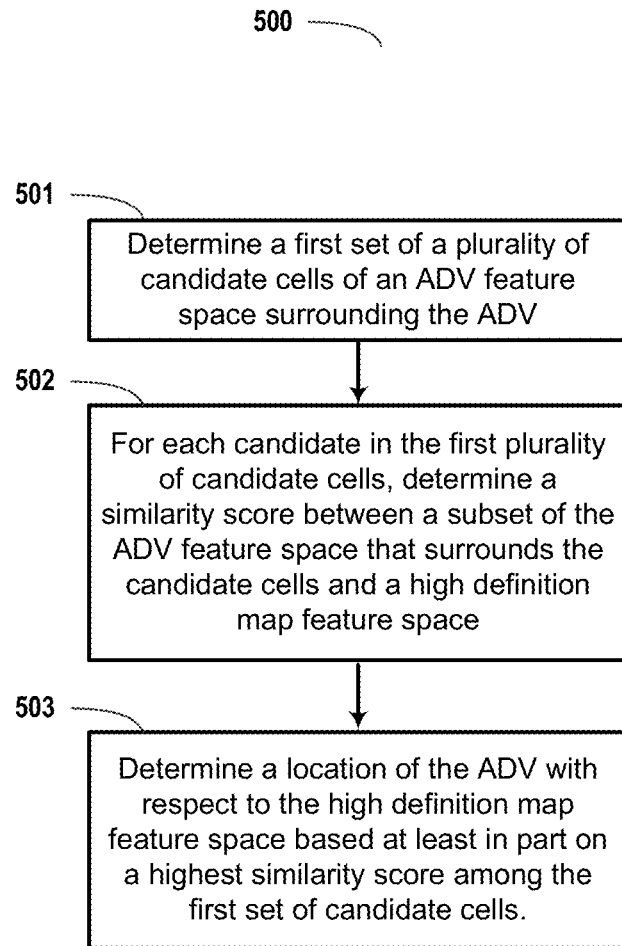
FIG. 5A illustrates, in block form, an overview of a method of searching an HD map to determine the location of an ADV with respect to the HD map, according to some embodiments.

FIG. 5A illustrates, in block form, an overview of a method 500 of searching an HD map to determine the location of an ADV with respect to the HD map, according to some embodiments.

In operation 501, location module 301A can determine a first set of a plurality of candidate cells of an ADV feature space surrounding the ADV. The feature space surrounding the ADV can be generated from 3D point cloud of data obtained from perception module 302, e.g. LIDAR, a GPS coordinate or coordination of cell towers, sonar, radar, other sensor, or a combination of these. The ADV feature space can be arranged in cells, e.g. 1024×1024 cells, each cell being approximately 10 cm×10 cm. Each cell can have an (x,y) coordinate of the cell with respect to the ADV, a mean intensity of the cell data obtained from the 3D point cloud, and a variance in elevation of cell data obtained from the 3D point cloud. The first set of a plurality of candidate cells of the ADV feature space can centered on the ADV, and can be a subset of the ADV feature space e.g. 32 cells×32 cells surrounding the ADV.

In operation 502, localization module 301 can obtain a portion of a high definition (HD) map that is centered on the approximate ADV location. The portion of the HD map can be obtained offline, e.g. from server 103 or 104, or from an onboard map in memory 351 or persistent storage 352. In operation 525, localization module 301 coarse search module 301B can perform a search of the map feature space using the first set of a plurality of candidate cells as described below in operation 600, with reference to FIG. 6. The coarse search 600 of coarse search candidate cells 410 yields a candidate cell with a highest similarity score of the candidate cell feature space to the HD map feature space.

In operation 503, localization module 301 can determine the ADV location with respect to the high definition map feature space based at least in part on the (x,y) coordinates of the candidate cell from the coarse search 600 having the highest similarity score.

Figure 5B:
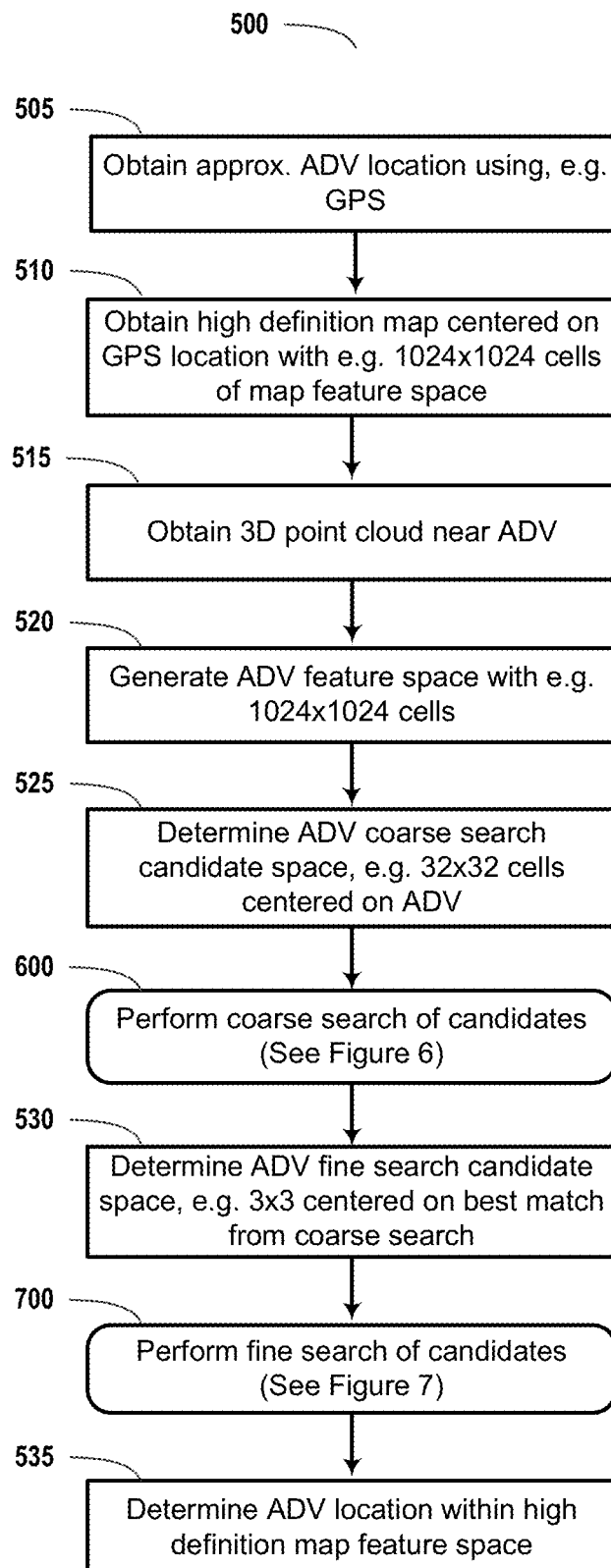
FIG. 5B illustrates, in block form, an overview of a method of searching an HD map to determine the location of an ADV with respect to the HD map, according to some embodiments.

FIG. 5B illustrates, in block form, an overview of a method 500 of searching an HD map to determine the location of an ADV with respect to the HD map, according to some embodiments.

In operation 505, location module 301A can obtain an approximate location of the ADV using information obtained from perception module 302, e.g. a GPS coordinate or coordination of cell towers, sonar, radar, other sensor, or a combination of these.

In operation 510, localization module 301 can obtain a portion of a high definition (HD) map that is centered on the approximate ADV location. The portion of the HD map can be obtained offline, e.g. from server 103 or 104, or from an onboard map in memory 351 or persistent storage 352.

In operation 515, localization module 301 can obtain a 3D point cloud of sensor data surrounding the ADV from perception module 302.

In operation 520, localization module 301 can use the 3D point cloud of sensor data to generate an ADV feature space of e.g. 1024×1024 cells, each cell being, e.g. 10 cm×10 cm. Each cell can have an (x,y) coordinate with the ADV feature space, a median intensity value and a variance of elevation value for the cell. The median intensity value is obtained from the 3D point cloud sensor data that comprise the cell. The variance of elevation value can also be obtained from the 3D point cloud sensor data that comprise the cell.

In operation 525, coarse search module 301B can determine a coarse search candidate space 410 of, e.g., 32×32 cells from the ADV feature space 425 that surrounds the ADV. The coarse search candidate space 410 can be centered on the ADV.

In operation 600, a coarse search of candidate cells in the coarse search candidate space 410 is performed. Operation 600 is described in detail, below, with reference to FIG. 6. The coarse search 600 of coarse search candidate cells 410 yields a candidate cell with a highest similarity score of the candidate cell feature space to the HD map feature space.

In operation 530, fine search module 301C can use the candidate cell of the coarse search 600 with the highest similarity score as the center 415 of a fine search candidate space 420. In an embodiment, the fine search space 420 can be 3 cells×3 cells in size.

In operation 700, fine search module 301C can perform a fine search of the fine search candidate space 420. Operation 700 is described in detail, below, with reference to FIG. 7. The fine search 700 yields a candidate cell with a highest similarity score, indicating a candidate cell whose feature space has a best match to the HD map feature space.

In operation 535, localization module 301 can determine the ADV location, with high accuracy, using the (x,y) coordinates of the candidate cell from the fine search 700 having the highest similarity score.

Figure 6:
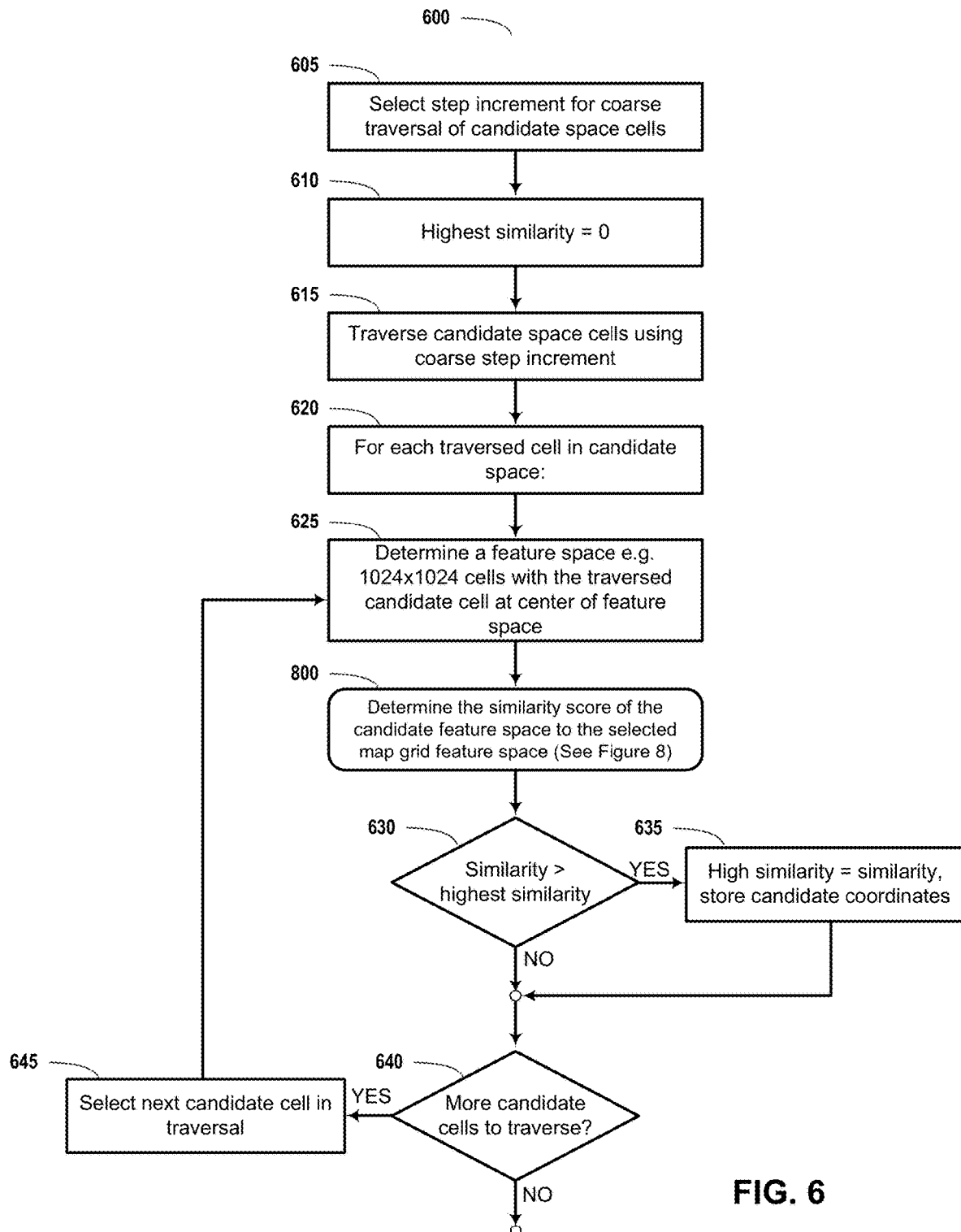
FIG. 6 illustrates, in block form, a method of performing a coarse search of an HD map to determine the location of an ADV with respect to the HD map, according to some embodiments.

FIG. 6 illustrates, in block form, a method 600 of performing a coarse search of an HD map feature space to determine the location of an ADV with respect to the HD map, according to some embodiments. An HD map feature space 430 has been determined in operation 510 of FIG. 5. A coarse search candidate space 410 has been determined in operation 525 of FIG. 5. The coarse search 600 can be performed by localization module 301, coarse search module 301B.

In operation 605, a step increment can be chosen for traversing the candidate search space 420. In an embodiment, the step increment can be two, such that the traversal of the candidate search space 410 determines a similarity score for every other cell in the candidate search space 410. In an example coarse search candidate space 410 having 32×32 cells, the traversal with a step increment of two would search 16×16 cells (256 cells), rather than the full 32×32 cells (1024 cells).

In operation 610, a highest similarity score variable can be set to zero, or other constant, such as −1.

In operation 615, traversal of the coarse search candidate space 410 begins, using the step increment selected in operation 605.

In operation 620, a first candidate cell in the coarse search candidate space 410. Method 600 traverses the candidate cells of the coarse search candidate space 410 in accordance with the step increment.

In operation 625, a candidate cell feature space of, e.g., 1024×1024 cells, is determined from the ADV feature space, surrounding the traversed candidate cell.

In operation 800, a similarity score is determined for the candidate cell. The similarity score represents a degree of similarity between the candidate cell feature space and the HD map feature space 430. Operation 800 is described in detail, below, with reference to FIG. 8.

In operation 630, it can be determined whether the similarity score for the traversed candidate cell is greater than the highest similarity found so far in the traversal of the coarse search candidate space 410. If so, then in operation 635, the highest similarity is set to the similarity score of the traversed candidate cell, and the coordinates of the traversed candidate cell are stored. Method 600 continues at operation 640.

In operation 640, it can be determined whether there are more candidate cells in the coarse search candidate space 410 to traverse. If so, then method 600 continues at operation 645, otherwise method 600 ends.

In operation 645, a next candidate cell is selected in the traversal of the coarse search candidate search space 410. Method 600 continues at operation 625.

Figure 7:
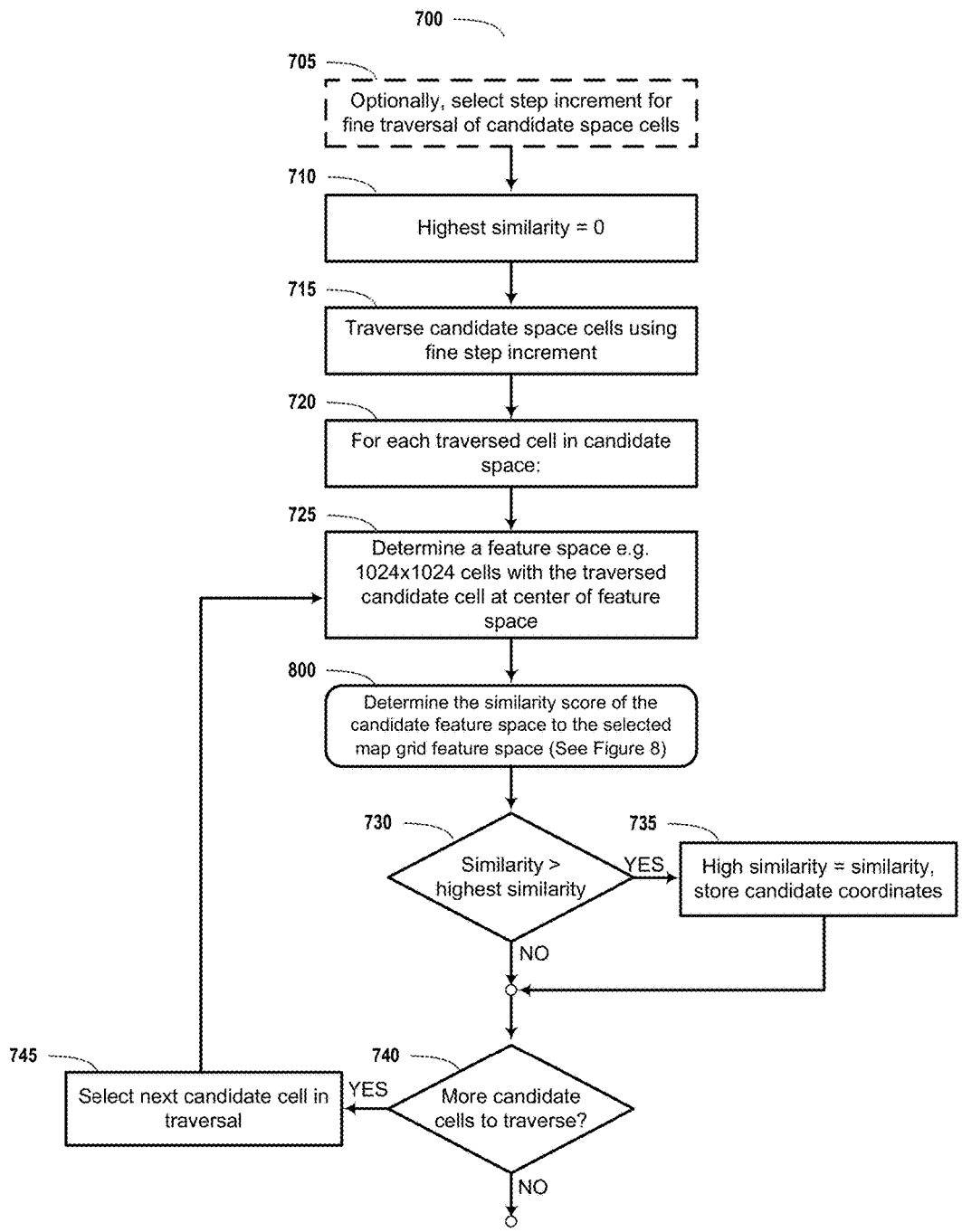
FIG. 7 illustrates, in block form, a method of performing a fine search of an HD map to determine the location of an ADV with respect to the HD map, according to some embodiments.

FIG. 7 illustrates, in block form, a method 700 of performing a fine search of an HD map to determine the location of an ADV with respect to the HD map, according to some embodiments. An HD map feature space 430 has been determined in operation 510 of FIG. 5. A fine search candidate space 420 has been determined in operation 530 of FIG. 5. The fine search 700 can be performed by localization module 301, fine search module 301C.

In operation 705, a step increment can optionally be chosen for traversing the fine search candidate search space 420. In an embodiment, the step increment can be one, by default.

In operation 710, a highest similarity score variable can be set to zero, or other constant, such as −1.

In operation 715, traversal of the fine search candidate space 420 begins, using the step increment optionally selected in operation 705, or step increment of one by default.

In operation 720, a first candidate cell in the fine search candidate search space 420. Method 600 traverses the candidate cells of the fine search candidate space 420 in accordance with the step increment.

In operation 725, a candidate cell feature space of, e.g. 1024×1024 cells, is determined from the ADV feature space, surrounding the traversed candidate cell.

In operation 800, a similarity score is determined for the candidate cell feature space. The similarity score represents a degree of similarity between the candidate cell feature space and the HD map feature space 430. Operation 800 is described in detail, below, with reference to FIG. 8.

In operation 730, it can be determined whether the similarity score for the traversed candidate cell is greater than the highest similarity found so far in the traversal of the fine search candidate space 420. If so, then in operation 735, the highest similarity is set to the similarity score of the traversed candidate cell, and the coordinates of the traversed candidate cell are stored. Method 700 continues at operation 740.

In operation 740, it can be determined whether there are more candidate cells in the fine search candidate space 420 to traverse. If so, then method 700 continues at operation 745, otherwise method 700 ends.

In operation 745, a next candidate cell is selected in the traversal of the fine search candidate search space 420. Method 700 continues at operation 725.

Figure 8:
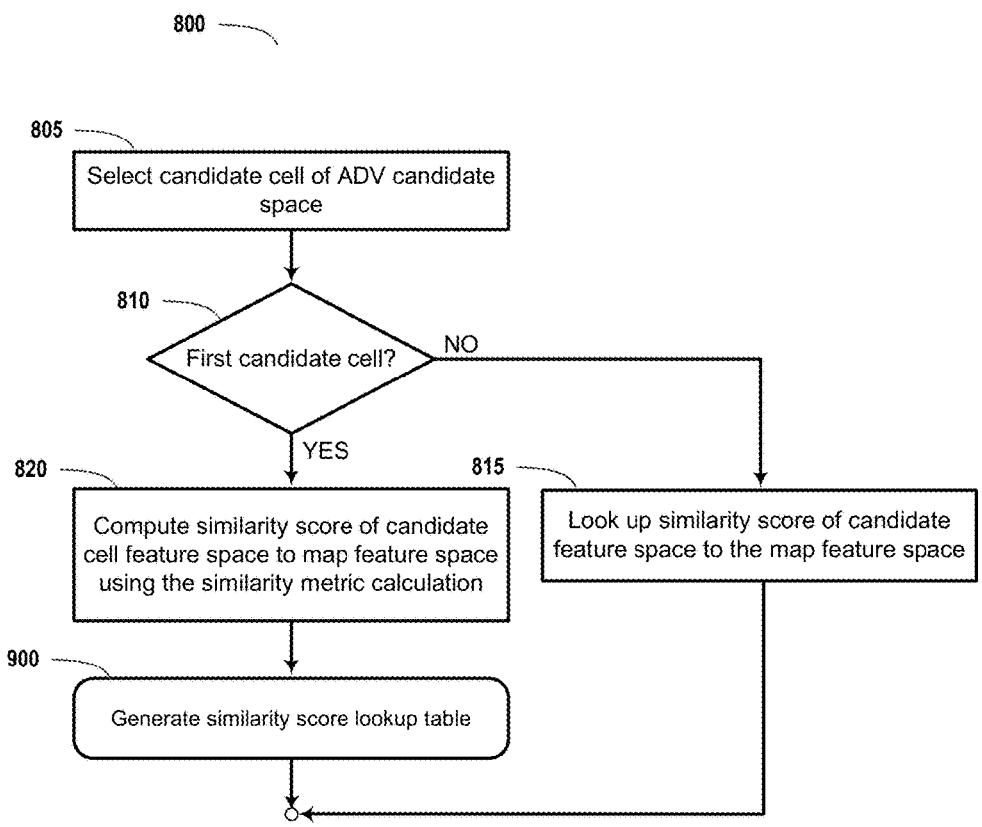
FIG. 8 illustrates, in block form, a method of matching a candidate cell feature space to an HD map feature space to determine a similarity score of the ADV candidate feature space to the HD map feature space, according to some embodiments.

FIG. 8 illustrates, in block form, a method 800 of matching a candidate cell feature space to an HD map to determine a similarity score of the ADV candidate feature space to the HD map feature space 430, according to some embodiments. In the coarse search 600 and fine search 700 described above with reference to FIG. 6 and FIG. 7, respectively, a similarity score is determined between a feature space of a candidate cell and the feature space of the HD map. The candidate cell feature space and HD map features space can each be, e.g. 1024×1024 cells. One way to determine a similarity score is to compute the similarity score using the similarity metric described herein. The similarity metric described herein uses a hybrid Gaussian fit of the candidate cell feature space to the HD map feature space using the mean of intensity of each cell of the candidate cell feature space and HD map feature space. The hybrid Gaussian fit of the candidate cell feature space to the HD map feature space additionally uses the variance in elevation of each cell of the candidate feature space and HD map feature space. This computed similarity metric gives a very accurate and robust fit, but is computationally expensive given the size of the candidate cell feature space and HD map feature space. In an embodiment, determining a similarity score for a candidate cell can be performed more rapidly by using an estimated similarity score determined from an approximation of the difference between the mean intensity value for each cell of the candidate feature space and HD map feature space, and an approximation of the sum of the variance in elevation values for each cell of the candidate feature space and HD map feature space, using a lookup table. In an embodiment, the lookup table can be generated when the similarity metric for a first candidate cell is computed. The lookup table can be stored in persistent storage device 352 as lookup table 313 or in memory 351. In an embodiment, the choice of whether to determine a similarity metric by computation or lookup table can be based upon an analysis of the mean intensity and variance in elevation values for a cell.

In operation 805, a candidate cell of traversal of a candidate search space, e.g. coarse search space 410, is selected.

In operation 810, it can be determined whether this is the first candidate cell being searched in the traversal of candidate search space cells.

If, in operation 810, it was determined that this is the first candidate cell being traversed in a search space of cells, then in operation 820 the similarity metric of the candidate cell feature space to the HD map feature space can be computed and, in operation 900, a similarity score lookup table can be generated. Operation 900 is described, below, with reference to FIG. 9.

If, in operation 810, it was determined that this is not the first candidate cell being traversed in a search space of cells, then the lookup table has already been generated, and in operation 815 the similarity metric of the candidate cell feature space to the HD map feature space can be looked up.

Figure 9:
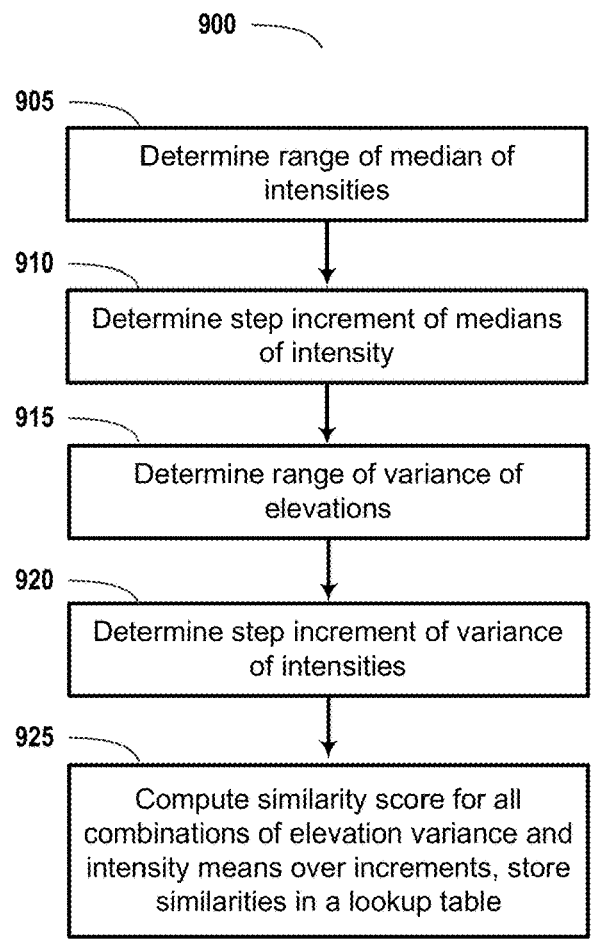
FIG. 9 illustrates, in block form, a method of building a lookup table to determine a similarity score of a candidate cell feature space to an HD map feature space, according to some embodiments.

FIG. 9 illustrates, in block form, a method 900 of building a lookup table 313 to determine a similarity score of a candidate cell feature space to an HD map feature space, according to some embodiments. The lookup table 313 can be a two-dimensional table, indexed by a range of mean intensity values and a range of variance in elevation values.

In operation 905, a range of median intensities can be determined for use in accessing the lookup table 313. The range of median intensities can be determined during a similarity metric computation of a first candidate cell by determining a minimum and maximum median intensity value found during the similarity metric computation. For example, the range of mean intensity values may be, e.g. 0.01 minimum through 24.92 maximum. The mean intensity values represent the difference between a mean intensity value of a cell in the candidate cell feature space and a mean intensity value of an HD map feature space cell.

In operation 910, the range of median intensity values can be rounded to a resolution that generates a reasonable size of lookup table. In the example above, the range of mean intensity values can be rounded to 0, 1, 2, . . . , 25, generating a step-wise estimate of application of the hybrid Gaussian fit of a candidate feature space to the HD map feature space.

In operation 915, the range of variance of elevation values can similarly be determined during a similarity metric computation of a first candidate cell. For example, the range of variance in elevation values may be, e.g. 0.09 minimum through 0.81 maximum. The variance in elevation values represent the sum of the variance in elevation value of a cell in the candidate feature space and the variance in elevation value of a cell of the HD map feature space.

In operation 920, the range of variance in elevation values can be rounded to a resolution that generates a reasonable size of lookup table. In the example above, the range of variance in elevation values may be rounded to 0.0, 0.1, . . . , 0.8, generating a step-wise estimate of application of the hybrid Gaussian fit of the candidate cell feature space to the HD grid feature space.

In operation 925, the lookup table 313 can be generated by computing the similarity score for all combinations of rounded mean intensity value and rounded variance in elevation value over their respective ranges.

Figure 10:
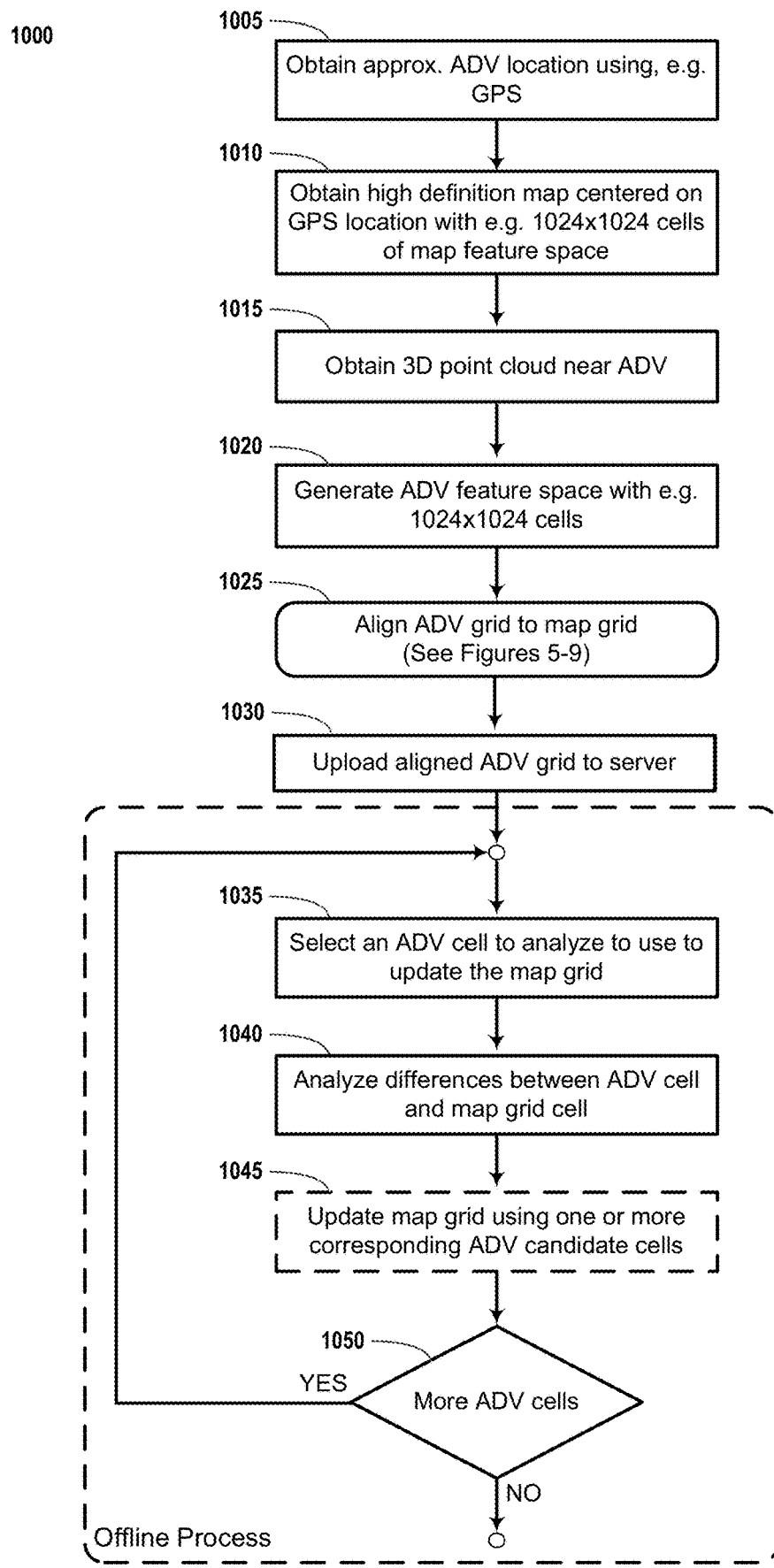
FIG. 10 illustrates, in block form, a method of updating the HD map, according to some embodiments.

FIG. 10 illustrates, in block form, a method 1000 of updating the HD map, according to some embodiments. As the real world changes, the HD map may need to be updated. To update the HD map, an ADV can generate 3D point clouds of sensor data as it travels, generate an ADV feature space, align the feature space to the HD map, and upload the aligned ADV feature space to, e.g., server 103 for analysis and updating of the HD map. Server 103 can include machine learning engine 103A, map updating module 103B, and map grid 103C. Machine learning engine 103A can be used by updating module 103B to generate an updated map grid 103C.

In an embodiment, one or more customer ADVs can voluntarily, or in exchange for compensation, upload their aligned ADV feature spaces to server 103. In an embodiment, server 103 can randomly poll one or more ADVs within an HD map feature space and download the ADV feature space from the ADV to the server 103. In an embodiment, a customer ADV can store ADV feature space information for one or more HD map feature spaces, and update the ADV's own onboard HD map grid 312 during a time that the ADV is not moving, as a background processing task. This is particularly useful for ADV customers who frequently travel the same route to and from a same destination at a same time of day. Reinforcement learning can greatly improve the detail and accuracy of the HD map over time.

The map update method 1000 can comprise two portions: an online portion, performed while the vehicle is being driven, and an offline portion wherein the collected ADV feature space information is collected, analyzed and used to update the HD map. The online portion of the map update method 1000 can be performed by map update module 306. The online portion is very similar to the online process used to by localization module 301, described in FIG. 5 through FIG. 9. The offline portion of the map update method 1000 can be performed by map update module 103B on server 103. In an embodiment wherein the ADV updates its own map grid 312, the offline portion of the map update method 1000 can be performed by map update module 306 as, e.g., a background task. or when the ADV is not moving.

In operation 1005, location module 301A can obtain an approximate location of the ADV using information obtained from perception module 302, e.g. a GPS coordinate or coordination with cell towers, sonar, radar, other sensor, or a combination of these.

In operation 1010, localization module 301 can obtain a portion of a high definition (HD) map that is centered on the approximate ADV location. The portion of the HD map can be obtained offline, e.g. from server 103 or 104, or from an onboard map in persistent storage 352.

In operation 1015, localization module 301 can obtain a 3D point cloud of sensor data surrounding the ADV from perception module 302.

In operation 1020, localization module 301 can use the 3D point cloud of sensor data to generate an ADV feature space of e.g. approximately 1024×1024 cells, each cell being, e.g., 10 cm×10 cm. Each cell can have an (x,y) coordinate within the ADV feature space, a median intensity value and a variance of elevation value for the cell. The median intensity value can be obtained from the 3D point cloud sensor data that comprise the cell. The variance of elevation value can also be obtained from the 3D point cloud sensor data that comprise the cell.

In operation 1025, the ADV can align the ADV feature space to an HD map feature space. Aligning an ADV feature space to an HD map feature space is described above with reference to FIG. 5 through FIG. 9.

In operation 1030, the ADV can upload the aligned ADV feature space to the server 103. In an embodiment, the ADV feature space can be uploaded to the server 103 with a reference to the HD map grid space. In an embodiment, the server can request the aligned the ADV feature space and download the aligned ADV feature space to the server 103.

Operations 1035 through 1050 will be described as being performed by a server 103 (offline operations), by map updating module 103B. Operations 1035 through 1050 can alternatively, or additionally, be performed offline or in a background task by an ADV map update module 306, updating its own map grid 312.

In operation 1035, server 103 can select a candidate cell of an ADV feature space to update the map grid, e.g. map grid 103C.

In operation 1040, map updating module 103B can analyze differences between the ADV candidate cell feature space and the map grid feature space. Analysis can include generating a candidate feature space, e.g. a 32×32 cell candidate feature space, surrounding the selected ADV cell. A similarity metric can be generated for each candidate cell within the candidate feature space. One or more candidate cells having a low similarity (e.g. in the 30th percentile) and having a high intensity value (e.g. in the 70th percentile), and having a high variance in elevation (e.g. in the 70th percentile) may be considered for updating the HD map grid with the ADV candidate cell. A cell having a low similarity score, but high intensity value and high variance in elevation could indicate that, e.g., a new building has been constructed since the last HD map update. Similarly, a cell having a low similarity score and low intensity value and high variance in elevation can indicate that an object, e.g. a building, previously existed in the HD map in the last update, but no longer exists in the ADV feature space. Server machine learning engine 103A can apply artificial intelligence methods, including or one or more rule-based systems, to determine the meaning of an aligned ADV feature space having significant differences with the HD map grid feature space, when the feature space is analyzed in smaller candidate spaces.

In operation 1045, depending up the results of the analysis in operation 1040, map updating module 103B can update the HD grid feature space using the analysis.

In operation 1050, it can be determined whether there are more ADV cells of a feature space to analyze. If so, method 1000 continues at operation 1035, otherwise method 1000 ends.

Figure 11:
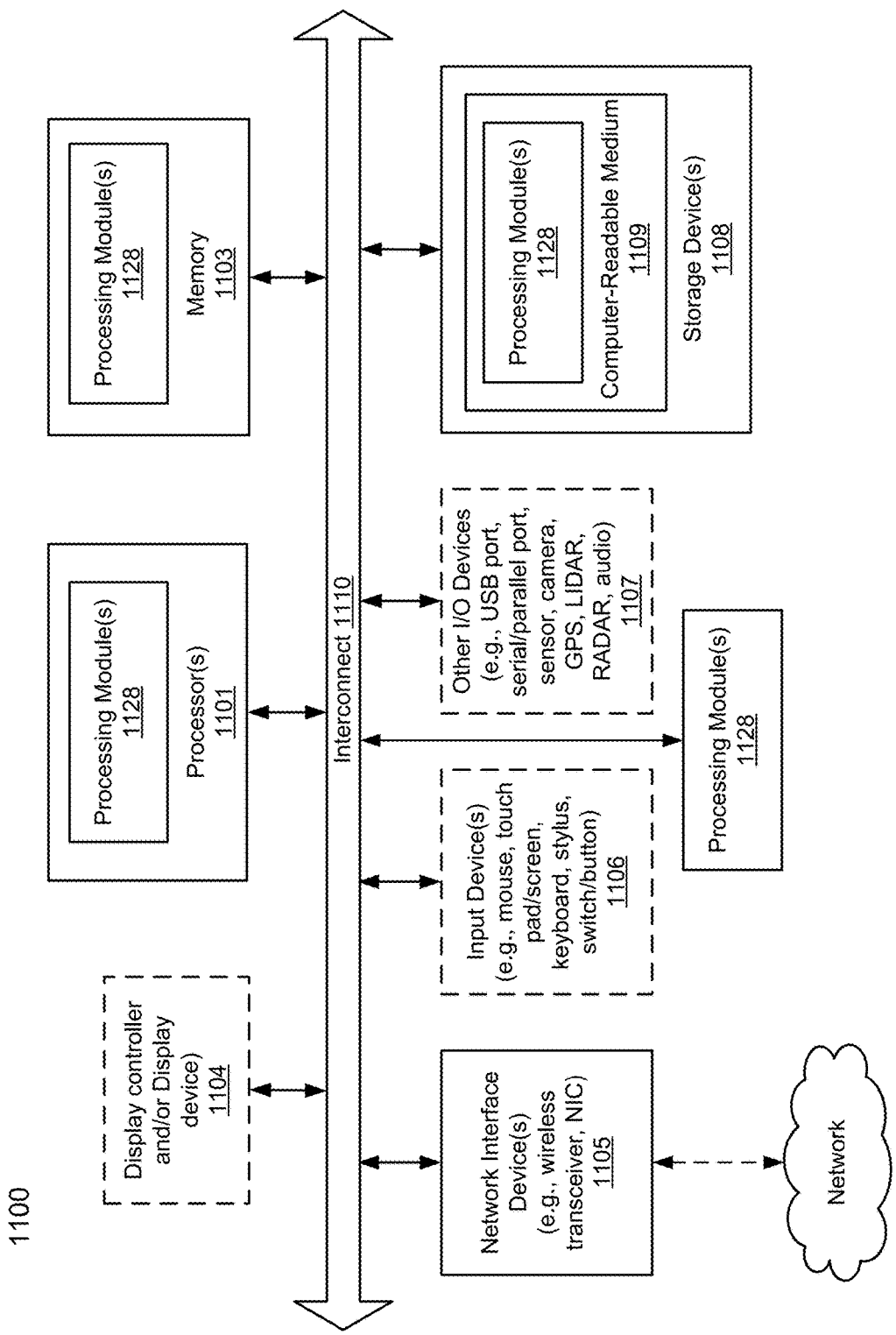
FIG. 11 is a block diagram illustrating a data processing system according to one embodiment.

FIG. 11 is a block diagram illustrating an example of a data processing system 1100 which may be used with one embodiment of the invention. For example, system 1100 may represent any of data processing systems described above performing any of the processes or methods described above, such as, for example, autonomous vehicle 101 systems, such as perception and planning 110, control system 111, infotainment system 114, etc., or any of servers 103-104 of FIG. 1. System 1100 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1100 is intended to show a high level view of many components of the computer system. However, it is to be understood that additional components may be present in certain implementations and furthermore, different arrangement of the components shown may occur in other implementations. System 1100 may represent a desktop, a laptop, a tablet, a server, a mobile phone, a media player, a personal digital assistant (PDA), an embedded processing controller, a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1100 includes processor 1101, memory 1103, and devices 1105-1108 via a bus or an interconnect 1110. Processor 1101 may represent a single processor or multiple processors with a single processor core or multiple processor cores included therein. Processor 1101 may represent one or more general-purpose processors such as a microprocessor, a central processing unit (CPU), or the like. More particularly, processor 1101 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1101 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions. In an embodiment, processor(s) 1101 comprise at least one hardware processor.

Processor 1101, which may be a low power multi-core processor socket such as an ultra-low voltage processor, may act as a main processing unit and central hub for communication with the various components of the system. Such processor can be implemented as a system on chip (SoC). Processor 1101 is configured to execute instructions for performing the operations and steps discussed herein. System 1100 may further include a graphics interface that communicates with optional graphics subsystem 1104, which may include a display controller, a graphics processor, and/or a display device.

Processor 1101 may communicate with memory 1103, which in one embodiment can be implemented via multiple memory devices to provide for a given amount of system memory. Memory 1103 may include one or more volatile storage (or memory) devices such as random access memory (RAM), dynamic RAM (DRAM), synchronous DRAM (SDRAM), static RAM (SRAM), or other types of storage devices. Memory 1103 may store information including sequences of instructions that are executed by processor 1101, or any other device. For example, executable code and/or data of a variety of operating systems, device drivers, firmware (e.g., input output basic system or BIOS), and/or applications can be loaded in memory 1103 and executed by processor 1101. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1100 may further include IO devices such as devices 1105-1108, including network interface device(s) 1105, optional input device(s) 1106, and other optional IO device(s) 1107. Network interface device 1105 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1106 may include a mouse, a touch pad, a touch sensitive screen (which may be integrated with display device 1104), a pointer device such as a stylus, and/or a keyboard (e.g., physical keyboard or a virtual keyboard displayed as part of a touch sensitive screen). For example, input device 1106 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1107 may include an audio device. An audio device may include a speaker and/or a microphone to facilitate voice-enabled functions, such as voice recognition, voice replication, digital recording, and/or telephony functions. Other IO devices 1107 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1107 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1110 via a sensor hub (not shown), while other devices such as a keyboard or thermal sensor may be controlled by an embedded controller (not shown), dependent upon the specific configuration or design of system 1100. IO devices 1107 may further include a RADAR system (radio detection and ranging), a LIDAR system (light detection and ranging), a GPS system (global positioning system), cell phone subsystems that can detect and triangulate using cell towers, microphone(s), and other, audio/video recording camera(s), position, distance, time, speed, acceleration, horizontal and vertical level detectors, orientation, and directional sensors.

To provide for persistent storage of information such as data, applications, one or more operating systems and so forth, a mass storage (not shown) may also couple to processor 1101. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1101, e.g., via a serial peripheral interface (SPI). This flash device may provide for non-volatile storage of system software, including BIOS as well as other firmware of the system.

Storage device 1108 may include computer-accessible storage medium 1109 (also known as a machine-readable storage medium or a computer-readable medium) on which is stored one or more sets of instructions or software (e.g., module, unit, and/or logic 1128) embodying any one or more of the methodologies or functions described herein. Processing module/unit/logic 1128 may represent any of the components described above, such as, for example, autonomous vehicle 101 (AV) localization module 301, perception module 302, driving decision module 303, planning module 304, control module 305, map update module 306, and one or more modules to process sensor data to for driving the AV planning and control modules. Processing module/unit/logic 1128 may also reside, completely or at least partially, within memory 1103 and/or within processor 1101 during execution thereof by data processing system 1100, memory 1103 and processor 1101 also constituting machine-accessible storage media. Processing module/unit/logic 1128 may further be transmitted or received over a network via network interface device 1105.

Computer-readable storage medium 1109 may also be used to store the some software functionalities described above persistently. While computer-readable storage medium 1109 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1128, components and other features described herein can be implemented as discrete hardware components or integrated in the functionality of hardware components such as ASICS, FPGAs, DSPs or similar devices. In addition, processing module/unit/logic 1128 can be implemented as firmware or functional circuitry within hardware devices. Further, processing module/unit/logic 1128 can be implemented in any combination hardware devices and software components.

Note that while system 1100 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method of determining an accurate location of an autonomous driving vehicle (ADV) with respect to a high-definition (HD) map representing a real-world environment surrounding the ADV and operating the ADV, the method comprising:
   determining an approximate location of the ADV using a global positioning system (GPS location of the ADV);
   obtaining a section of the HD map having the GPS location of the ADV substantially at the center of the section of the HD map;
   determining a first set of a plurality of candidate cells of an ADV feature space of cells surrounding the ADV, the first set representing a coarse search space of the ADV feature space, each candidate cell in the coarse search space having a median intensity and a variance in elevation, the ADV feature space determined using one or more sensors of the ADV;
   for each candidate cell in the coarse search space, determining a similarity score between a feature space that surrounds the candidate cell (candidate cell feature space), and a feature space of the section of the HD map surrounding the GPS location of the ADV, using a similarity metric, wherein the similarity metric is based at least in part on the candidate cell median intensity and the candidate cell variance in elevation, wherein the similarity metric represents, for the candidate cell, a similarity of the candidate cell feature space to the HD map feature space surrounding the GPS location of the ADV;
   determining a location of the ADV with respect to the HD map feature space based at least in part on the candidate cell having the highest similarity score among the candidate cells of the coarse search space; and
   navigating the ADV based at least in part on the determined location of the ADV with respect to the HD map.

2. The method of claim 1, wherein the first set of the plurality of candidate cells comprise every other cell of a predetermined grid of cells surrounding the ADV.

3. The method of claim 1, wherein, for a first candidate cell in the coarse search space, determining the similarity score for the first candidate cell comprises computing the similarity score using the first candidate median intensity and the first candidate cell variance in elevation, and the method further comprises:
   using information obtained from computing the similarity score of the first candidate cell to generate a lookup table of similarity scores.

4. The method of claim 3, wherein the lookup table is indexed by a range of mean intensity values and a range of variance in elevation values.

5. The method of claim 3, wherein for a second candidate cell, and subsequent candidate cells in the plurality of candidate cells, determining the similarity score for each of the second candidate cell and the subsequent candidate cells comprises looking up the similarity score in the lookup table using the median intensity and the variance in elevation for each of the second candidate cell and the subsequent candidate cells, respectively.

6. The method of claim 1, further comprising, after determining the candidate cell having a highest similarity score in the coarse search space:
- determining a second set of a plurality of candidate cells surrounding the candidate cell having the highest similarity score of the coarse search space, the second set representing a fine search space within the coarse search space; and
- for each candidate cell in the fine search space:
  - determining a fine search similarity score between a feature space that surrounds the fine search candidate cell (fine search candidate cell feature spacer), and the HD map feature space, wherein the fine search similarity score represents, for the fine search candidate cell, a similarity of the fine search candidate cell feature space to the HD map feature space; and
  - wherein determining the location of the ADV location within the HD map feature space is further based at least in part on the fine search candidate cell having the highest fine search similarity score.

7. The method of claim 6, wherein determining the fine search similarity score comprises computing the fine search similarity score for each of the plurality of fine search candidate cells.

8. The method of claim 6, wherein determining the location of the ADV within the HD map feature space further comprises determining an offset between the ADV and the fine search candidate cell having the highest fine search similarity score to the HD map feature space.

9. A non-transitory machine-readable medium having instructions stored therein, which when executed by a processor, cause the processor to perform operations that determine an accurate location of an autonomous driving vehicle (ADV) with respect to a high-definition (HD) map representing a real-world environment surrounding the ADV, the operations comprising:
- determining an approximate location of the ADV using a global positioning system (GPS location of the ADV);
- obtaining a section of the HD map having the GPS location of the ADV substantially at the center of the section of the HD map;
- determining a first set of a plurality of candidate cells of an ADV feature space of cells surrounding the ADV, the first set representing a coarse search space of the ADV feature space, each candidate cell in the coarse search space having a median intensity and a variance in elevation, the ADV feature space determined using one or more sensors of the ADV;
- for each candidate cell in the coarse search space, determining a similarity score between a feature space that surrounds the candidate cell (candidate cell feature spacer), and a feature space of the section of HD map surrounding the GPS location of the ADV, using a similarity metric, wherein the similarity metric is based at least in part of on the candidate cell median intensity and the candidate cell variance in elevation, wherein the similarity metric represents, for the candidate cell, a similarity of the candidate cell feature space to the HD map feature space surrounding the GPS location of the ADV;
- determining a location of the ADV with respect to the HD map feature space based at least in part on the candidate cell having the highest similarity score among the candidate cells of the coarse search space; and
- navigating the ADV based at least in part on the determined location of the ADV with respect to the HD map.

10. The non-transitory machine-readable medium of claim 9, wherein the first set of the plurality of candidate cells comprise every other cell of a predetermined grid of cells surrounding the ADV.

11. The non-transitory machine-readable medium of claim 9, wherein, for a first candidate cell in the coarse search space, determining the similarity score for the first candidate cell comprises computing the similarity score using the first candidate median intensity and the first candidate cell variance in elevation, and the operations further comprise:
- using information obtained from computing the similarity score of the first candidate cell to generate a lookup table of similarity scores.

12. The non-transitory machine-readable medium of claim 11, wherein the lookup table is indexed by a range of mean intensity values and a range of variance in elevation values.

13. The non-transitory machine-readable medium of claim 11, wherein for a second candidate cell, and subsequent candidate cells in the plurality of candidate cells, determining the similarity score for each of the second candidate cell and the subsequent candidate cells comprises looking up the similarity score in the lookup table using the median intensity and the variance in elevation for each of the second candidate cell and the subsequent candidate cells, respectively.

14. The non-transitory machine-readable medium of claim 9, further comprising, after determining the candidate cell having a highest similarity score in the coarse search space:
- determining a second set of plurality of candidate cells surrounding the candidate cell having the highest similarity score of the coarse search space, the second set representing a fine search space within the coarse search space; and
- for each candidate cell in the fine search space:
  - determining a fine search similarity score between a feature space that surrounds the fine search candidate cell (fine search candidate cell feature spacer), and the HD map feature space; and
  - wherein determining the location of the ADV location within the HD map feature space is further based at least in part on the fine search candidate cell having the highest fine search similarity score.

15. The non-transitory machine-readable medium of claim 14, wherein determining the fine search similarity score comprises computing the fine search similarity score for each of the plurality of fine search candidate cells.

16. The non-transitory machine-readable medium of claim 14, wherein determining the location of the ADV within the HD map feature space further comprises determining an offset between the ADV and the fine search candidate cell having the highest fine search similarity score to the HD map feature space.

17. A data processing system, comprising:
a processor; and
a memory coupled to the processor to store instructions, which when executed by the processor, cause the processor to perform operations that determine an accurate location of an autonomous driving vehicle (ADV) with respect to a high-definition (HD) map representing a real-world environment surrounding the ADV, the operations including:
determining an approximate location of the ADV using a global positioning system (GPS location of the ADV);
obtaining a section of the HD map having the GPS location of the ADV substantially at the center of the section of the HD map;
determining a first set of a plurality of candidate cells of an ADV feature space of cells surrounding the ADV, the first set representing a coarse search space of the ADV feature space, each candidate cell in the coarse search space having a median intensity and a variance in elevation, the ADV feature space determined using one or more sensors of the ADV;
for each candidate cell in the coarse search space, determining a similarity score between a feature space that surrounds the candidate cell (candidate cell feature spacer), and a feature space of the section of the HD map surrounding the GPS location of the ADV, using a similarity metric, wherein the similarity metric is based at least in part on the candidate cell median intensity and the candidate cell variance in elevation, wherein the similarity score represents, for the candidate cell, a similarity of the candidate cell feature space to the HD map feature space surrounding the GPS location of the ADV;
determining a location of the ADV with respect to the HD map feature space based at least in part on the candidate cell having the highest similarity score among the candidate cells of the coarse search space; and
navigating the ADV based at least in part on the determined location of the ADV with respect to the HD map.

18. The data processing system of claim 17, wherein the first set of the plurality of candidate cells comprise every other cell of a predetermined grid of cells surrounding the ADV.

19. The data processing system of claim 17, wherein, for a first candidate cell in the coarse search space, determining the similarity score for the first candidate cell comprises computing the similarity score using the first candidate median intensity and the first candidate cell variance in elevation, and the operations further comprise:
using information obtained from computing the similarity score of the first candidate cell to generate a lookup table of similarity scores.

20. The data processing system of claim 19, wherein the lookup table is indexed by a range of mean intensity values and a range of variance in elevation values.

21. The data processing system of claim 19, wherein for a second candidate cell, and subsequent candidate cells in the plurality of candidate cells, determining the similarity score for each of the second candidate cell and the subsequent candidate cells comprises looking up the similarity score in the lookup table using the median intensity and the variance in elevation for each of the second candidate cell and the subsequent candidate cells, respectively.

22. The data processing system of claim 17, the operations further comprising, after determining the candidate cell having a highest similarity score in the coarse search space:
determining a second set of a plurality of candidate cells surrounding the candidate cell having the highest similarity score of the coarse search space, the second set representing a fine search space within the coarse search space; and
for each candidate cell in the fine search space:
determining a fine search similarity score between a feature space that surrounds the fine search candidate cell (fine search candidate cell feature spacer), and the HD map feature space, wherein the fine search similarity score represents, for the fine search candidate cell, a similarity of the fine search candidate cell feature space to the HD map feature space; and
wherein determining the location of the ADV location within the HD map feature space is further based at least in part on the fine search candidate cell having the highest fine search similarity score.

23. The data processing system of claim 22, wherein determining the fine search similarity score comprises computing the fine search similarity score for each of the plurality of fine search candidate cells.

24. The data processing system of claim 22, wherein determining the location of the ADV within the HD map feature space further comprises determining an offset between the ADV and the fine search candidate cell having the highest fine search similarity score to the HD map feature space.

* * * * *